US012183089B2

(12) United States Patent
Pikart et al.

(10) Patent No.: US 12,183,089 B2
(45) Date of Patent: Dec. 31, 2024

(54) ASSEMBLY FOR A VEHICLE, LIGHTING UNIT, VEHICLE, AND VEHICLE COMPRISING AN ASSEMBLY

(71) Applicants: ams OSRAM Automotive Lighting Systems GmbH, Munich (DE); Continental Automotive Technologies GmbH, Hannover (DE)

(72) Inventors: Philip Pikart, Munich (DE); Christian Gammer, Traitsching (DE); Jan-Erik Kuenecke, Regensburg (DE); Benjamin Dollinger, Regensburg (DE)

(73) Assignees: ams OSRAM Automotive Lighting Systems Gmbh, Munich (DE); Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 17/785,030

(22) PCT Filed: Nov. 23, 2020

(86) PCT No.: PCT/EP2020/083031
§ 371 (c)(1),
(2) Date: Jun. 13, 2022

(87) PCT Pub. No.: WO2021/115767
PCT Pub. Date: Jun. 17, 2021

(65) Prior Publication Data
US 2023/0031892 A1 Feb. 2, 2023

(30) Foreign Application Priority Data
Dec. 13, 2019 (DE) .......................... 102019134343.7

(51) Int. Cl.
*G06V 20/58* (2022.01)
*B60Q 1/08* (2006.01)
(Continued)

(52) U.S. Cl.
CPC ............... *G06V 20/58* (2022.01); *B60Q 1/08* (2013.01); *F21S 41/39* (2018.01); *F21S 41/675* (2018.01);
(Continued)

(58) Field of Classification Search
CPC .... G06V 20/58; G06V 10/141; G06V 10/147; B60Q 1/08; F21S 41/39; F21S 41/675;
(Continued)

(56) References Cited

U.S. PATENT DOCUMENTS 9,855,887 B1 * 1/2018 Potter .................. F21S 41/675
10,670,217 B2 6/2020 Gammer et al. ...... F21S 41/321
(Continued)

FOREIGN PATENT DOCUMENTS

DE 102006059064 A1 6/2008
DE 102017219092 A1 4/2019
(Continued)

OTHER PUBLICATIONS

Written Opinion of the International Searching Authority (EPO) associated with the Int'l Search Report mailed on Apr. 22, 2021 in the related PCT application PCT/EP2020/083031 (6 pages).
(Continued)

Primary Examiner — Nasim N Nirjhar
(74) Attorney, Agent, or Firm — Imperium Patent Works; Darien K. Wallace

(57) ABSTRACT

An arrangement or a projection headlight with a modulator, in particular with a DMD, is disclosed. In this case, a projection lens of the arrangement not only images the image content of the modulator in the surrounding area, but also images the surrounding area on the modulator. The modulator can thus guide the imaging of the surrounding area to a camera and reflect light from a light source into the surrounding area.

20 Claims, 3 Drawing Sheets

(51) Int. Cl.
*F21S 41/39* (2018.01)
*F21S 41/675* (2018.01)
*G06T 7/13* (2017.01)
*G06V 10/141* (2022.01)
*G06V 10/147* (2022.01)
*H04N 23/56* (2023.01)
*H04N 23/74* (2023.01)

(52) U.S. Cl.
CPC .............. *G06T 7/13* (2017.01); *G06V 10/141* (2022.01); *G06V 10/147* (2022.01); *H04N 23/56* (2023.01); *H04N 23/74* (2023.01); *G06T 2207/30252* (2013.01)

(58) Field of Classification Search
CPC . G06T 7/13; G06T 2207/30252; H04N 23/56; H04N 23/74
See application file for complete search history.

(56) References Cited

U.S. PATENT DOCUMENTS

| | | | | |
|---|---|---|---|---|
| 10,696,225 | B2 | 6/2020 | Yagi | B60Q 11/005 |
| 11,320,588 | B1* | 5/2022 | Mazed | G16H 10/40 |
| 2008/0151194 | A1* | 6/2008 | Segev | G03B 21/26 |
| | | | | 353/28 |
| 2014/0320633 | A1* | 10/2014 | Haugen | H04N 23/74 |
| | | | | 348/87 |
| 2015/0268464 | A1* | 9/2015 | Ranalli | G02B 13/06 |
| | | | | 348/36 |
| 2016/0377252 | A1* | 12/2016 | Bhakta | F21V 23/003 |
| | | | | 362/520 |
| 2018/0022266 | A1 | 1/2018 | Tzeng | B60Q 1/143 |
| 2020/0053328 | A1* | 2/2020 | Xu | H04N 9/3129 |
| 2020/0184662 | A1* | 6/2020 | Gurrapu | G01B 11/2513 |
| 2020/0324687 | A1 | 10/2020 | Yamamura et al. | B60Q 1/14 |
| 2021/0206312 | A1 | 7/2021 | Mochizuki et al. | B60Q 1/085 |

FOREIGN PATENT DOCUMENTS

| | | |
|---|---|---|
| DE | 102017220056 A1 | 5/2019 |
| JP | 2009-090844 A | 4/2009 |
| JP | 2018-134982 | 8/2018 |
| JP | 2019-102207 | 6/2019 |
| WO | WO 2020/131055 | 7/2019 |
| WO | WO 2020/067113 | 4/2020 |

OTHER PUBLICATIONS

English translation of the Written Opinion in A above of the ISA for the ISR in the related PCT application PCT/EP2020/083031 (6 pages).
Tamburo Robert et al.: "Programmable Automotive Headlights," Sep. 6, 2014, Lecture Notes in Computer Science, pp. 750-765, XP047531147 (16 pages).
Tamburo Robert et al.: "DMDs for Smart Headlights," Proceedings of SPIE, IEEE, US, Bd. 8979, Mar. 7, 2014, pp. 89790F-89790F, XP060034751, ISBN: 978-1-62841-730-2 (4 pages).
International Search Report dated Apr. 6, 2021 from the European Patent Office in the related PCT application PCT/EP2020/083031 citing references E-F above together with English translation (6 pages).
Search Report dated Sep. 29, 2020 from the German Patent Office in the priority German application DE 102019134343.7 citing references B-D above (6 pages).
English translation of the Search Report dated Sep. 29, 2020 from the German Patent Office listed in H above. (2 pages).
Notice of allowance by the Japanese Patent Office in the related Japanese Patent application JP2022-534678 dated Jun. 7, 2023 citing references D-I (3 pages).

* cited by examiner

ASSEMBLY FOR A VEHICLE, LIGHTING UNIT, VEHICLE, AND VEHICLE COMPRISING AN ASSEMBLY

CROSS REFERENCE TO RELATED APPLICATION

This application is a U.S. National Stage entry under 35 U.S.C. § 371 based on International Application No. PCT/EP2020/083031, filed on Nov. 23, 2020, which was published under PCT Article 21(2) and which claims priority from German Application No. 102019134343.7, filed on Dec. 13, 2019. The disclosure of each of the foregoing documents is incorporated herein by reference.

TECHNICAL FIELD

The invention relates to an arrangement for a vehicle with which light is emittable. Furthermore, the invention relates to a lamp for a vehicle. A vehicle with such an arrangement is also provided. Furthermore, the invention relates to a method with the arrangement.

BACKGROUND

Vehicles that have a vehicle lamp in the form of a headlight are well known from the prior art. During the day or at night, the visibility for a driver of the vehicle can be impaired, for example due to fog, rain or other natural phenomena. In such a case, it would be conceivable to increase the brightness of the headlight. However, it has been shown that this does not substantially lead to an improvement in the visibility. In addition, legal regulations must be observed, which is why only a specific maximum brightness of the headlight is allowed. It is also known to adapt a light color and, for example, to use yellow light or to use fog lights. This leads to an improvement with respect to dazzling of the driver and others.

A vehicle with a vehicle window is known from DE102017219092A1. A camera inside the vehicle can record light images via the vehicle window. A portion of the vehicle window that lies within a field of view of the camera can be electrically controlled. In this way, an optical property of the portion influencing the light transmissivity can be set.

SUMMARY

In contrast, the invention is based on the object of creating an arrangement for a vehicle, a lamp, a vehicle and a method with which visibility is improved, in particular for a vehicle driver, in a cost-effective and simple manner.

According to the invention, an arrangement is provided in particular for a vehicle or for a vehicle lamp, which has a spatial modulator for light. Furthermore, the arrangement advantageously has a light source with which light is emittable, in particular directable, via the modulator to a light passage of the arrangement. The light that is emittable by the light source can thus be directable or deflectable in a targeted manner via the modulator to the light output. The light from the light source can be influenced and/or controlled via the modulator. Furthermore, the arrangement advantageously has a camera with which a light image or a camera image or light is capturable via the light passage and via the modulator. In particular, the modulator can direct or deflect the light image entering via the light passage to the camera, or deflect or direct it in a targeted manner. This is done, for example, by guiding light through the light passage to the modulator and via the modulator to the camera. More preferably, a control means or a control unit can be provided through which the light source and/or through which the modulator is/are controllable in dependence on the light image captured via the camera.

This solution has the advantage that the light that is emittable by the light source is adaptable to a surrounding area of the arrangement, that is to say to the light image that images the surrounding area and is capturable by the camera. Thus, for example, poor visibility due to fog, rain or other natural phenomena can be captured via the light image from the camera, and the modulator and/or the light source can be controlled accordingly in order to improve visibility, for example, for a vehicle driver of a vehicle using the arrangement. In contrast to the prior art, for example, to the fog lamp, the light that is emittable by the arrangement can be adapted dynamically and is not static, as is the case with the fog lamp. The visibility of a surrounding area of the arrangement can thus be improved in a simple manner. Furthermore, the arrangement is very inexpensive in comparison to a system that is based, for example, on infrared and/or thermal radiation. In addition, no display on which the image captured via infrared and/or thermal radiation is displayed is required in the vehicle for the vehicle driver. In the arrangement according to the invention, by contrast, the emitted light is adapted in dependence on the captured light image in such a way that the visibility of the surrounding area is improved. In other words, through the combination of sensors and actuators in the arrangement, a natural image of the surrounding area can be captured and enhanced by intelligent lighting.

In a further configuration of the invention, provision can be made for the control means to have, in particular, a computer-implemented, image processing algorithm. Said algorithm is preferably configured in such a way that the light image captured by the camera is analyzable. The light source and/or the modulator can then advantageously be controlled via the control means depending on the analysis of the light image.

At least one image property and/or at least one image structure and/or edges and/or a contrast is/are advantageously ascertainable via the image processing algorithm for the analysis in the light image captured by the camera. This is highly advantageous because, for example, edges and/or a contrast of the light image are/is important elements influencing the visibility of a surrounding area for a person. For example, it is conceivable that the control means then controls the modulator and/or the light source depending on the captured edges and/or the captured contrast and/or depending on the at least one image property and/or the at least one image structure in order to improve the visibility of the surrounding area and/or to improve object recognition, in particular for the vehicle driver.

In a further configuration of the invention, provision can be made for the control means to control the modulator and/or the light source depending on the captured edges and/or the captured contrast in such a way that the contrast and/or the edges is/are enhanced at least in the surrounding area that is capturable by the camera.

The light emitted by the arrangement is preferably continuously adapted by continuously capturing the light image and controlling the modulator and/or the light source by way of the control means in dependence on the light image. It would also be conceivable to provide or check the adaptation of the modulator and/or the light source via the control means at specific, in particular regular, points in time.

Provision can thus be made for the camera to capture a light image only at specific, in particular regular, points in time.

The light image that is capturable by the camera preferably corresponds at least partially or completely or substantially completely to the surroundings portion of the surrounding area that is fully illuminable by the light source.

The control means can preferably control the modulator and/or the light source depending on the captured edges and/or the captured contrast in such a way that light emitted by the light source radiates outward via the light passage and enhances the contrast and/or the edges of the surroundings portion of the surrounding area that is perceptible by a person, in particular the vehicle driver. The person can thus better perceive the contrast and/or the edges of the surroundings portion, for example, the surrounding area in front of the vehicle. In other words, the control means can control the modulator and/or the light source depending on the captured edges and/or the captured contrast in such a way that the modulator forms an overlay image that is then overlaid on a surrounding portion and/or projected outward.

In other words, edges and/or a contrast are detected in the light image of the camera or the camera image with the image processing algorithm and are reproduced in the headlight or in the light emitted by the light source. In the proposed arrangement, the "real" image of the surrounding area can thus be recorded and used for the illumination in such a way that the vehicle driver can perceive the "real" surrounding area with a higher contrast and/or improved edges.

Such an image processing algorithm requires little computing time, which is why the latency times between capturing the light image and controlling the modulator and/or the light source are extremely small. If, on the other hand, a radar sensor is used, for example, to capture the surrounding area, the image captured by the radar sensor, for example, of a cyclist in the fog, must be perceived by the vehicle driver via a display. This is done, for example, via an augmented reality head-up display (HUD), which makes the danger clear to the vehicle driver in an artificially stylized manner. To do this, the driver must then look at the HUD. It also takes a certain amount of time until a signal from the radar sensor is correctly detected by a driver assistance system. In contrast, using the arrangement according to the invention, the surrounding area is fully illuminated in an improved manner, with the result that the vehicle driver can immediately perceive the surrounding area in an improved manner. For example, the driver can better perceive a cyclist in the fog. In addition, it is not necessary to make the danger clear to the vehicle driver, as is the case with a radar sensor and the HUD, which is why sensor misinterpretations cannot occur with the arrangement according to the invention.

In a further configuration of the invention, the light passage is preferably formed by at least one lens, in particular by a projection lens. In this way, the light from the light source can be advantageously emitted into the surrounding area and, in addition, the light image can be captured by the camera with a high quality.

It is conceivable that several light passages are provided. It is conceivable, for example, that a light passage, in particular a light exit for the light from the light source, and a light passage, in particular a light entry for the light of the camera, are provided. The advantage of a single light passage is that the arrangement is simpler and less expensive in terms of device technology.

In a further configuration of the invention, the spatial modulator is a spatial micromirror actuator. The latter has, for example, a multiplicity of mirrors. These can each be tiltable, in particular with a high frequency, in particular independently of one another, between two mirror positions and each form a light pixel. In a first position of a respective mirror, for example, the light from the light source can be reflected to the light passage. By contrast, in the second position, for example, the light image entering via the light passage can be directed to the camera. Thus, the spatial modulator simply has a double function in terms of device technology, to be precise to control the light that is emittable by the light source and, in addition, to guide the light image to the camera if required. It is conceivable that the spatial modulator for light is a spatial light modulator (SLM). Alternatively, it is conceivable that the modulator is designed as a digital micro-mirror actuator (digital micro-mirror device (DMD)) or as a liquid crystal display (LCD) or as one or more microelectromechanical system/s (MEMS) or liquid crystal-on-silicon (LCoS) and/or is formed from monomaterial. It is also conceivable to design the modulator digitally or analogously.

In the first position of a mirror of the modulator, the light from the light source can be guided to the light exit, which can be referred to as the ON state. In the second position, which may be described as the OFF state, for example, light is usually guided to the beam dump in the prior art. In the case of the invention, the camera can be arranged at the location at which the beam dump is arranged in the prior art.

In a further preferred configuration of the invention, the camera is designed and arranged in such a way that it images the reflection plane of the modulator or the modulator plane from an oblique axis via a lens in a Scheimpflug configuration. In other words, the image plane, in particular of a camera chip or image sensor, of the camera and a main plane of a lens of the camera and a projection plane or focal plane of the modulator are arranged in such a way that they intersect in a common straight line, i.e., are preferably arranged according to the Scheimpflug principle. A Scheimpflug configuration can likewise be provided if a mirror is provided between the camera and the modulator to direct the light image via the modulator to the mirror and from there to the camera. The projection plane or focal plane then continues to be the modulator plane. Thus, in the field of view of the "spatial light modulator" or modulator, an image of the surrounding area can be recorded in a parallax-free manner. In other words, the arrangement, in particular in the form of a light projector, has a dual function. The arrangement can be used simultaneously as an actuator, in particular by way of the modulator in combination with the light source (projector), and as an image sensor, in particular by way of the camera.

This can be used primarily for light functions that are intended to reinforce or mark constituent parts of the surrounding area or of objects in the surrounding area. For this purpose it would be advantageous for the coordinates (for example of a pixel sensor) of the camera sensor to be brought into a direct, unchanging relationship with the coordinates of the projected image, which is the case with the parallax-free combination of sensor and actuator.

In other words, the light image of the camera can be recorded without parallax using the Scheimpflug configuration, which enables an improved analysis by way of the image processing algorithm. The lens of the camera is preferably tiltable or pivotable with respect to the image sensor of the camera in order to set the camera or macro-camera as appropriate.

In a further configuration of the invention, provision can be made for the camera to have an image sensor with image pixels. These can then preferably be assigned to the light pixels of the modulator. Thus, in particular in the Scheimpflug configuration, a clear, in particular parallax-free, assignment of the image pixels to the light pixels can take place. This allows an extremely simple analysis of the light image via the image processing algorithm. In addition, due to the clear assignment, the modulator can be controlled extremely easily, for example, to emit the overlay image. In a further configuration, the respective image pixels and/or groups of image pixels can each be assigned to a light pixel and/or to a respective group of light pixels of the modulator. For example, it is conceivable that a group of four image pixels in each case is assigned to an individual light pixel. As already mentioned above, the arrangement is preferably designed in such a way that the assignment and arrangement of the image pixels to the light pixels takes place without parallax.

In the camera function, the image sensor of the camera is preferably read at a specific frame rate, for example between 30 and 60 Hz or in the KHz or MHz range. The data read are then preferably further processed by the image processing algorithm.

In the preferred embodiment of the invention, provision can be made for a modulator to be controlled in such a way that at least some or all of the mirrors are in the second switch position, in order to record a light image via the camera. The second switch position is the on or off state of the mirrors. The light function preferably takes place in the on state and the camera function in the off state. In other words, the camera is arranged in such a way that, in the second switch position of the mirrors, it captures the reflection of the surrounding area imaged by the light passage or by the lens or projection lens in the light passage. The period of time for arranging the mirror in the second switch position is preferably selected such that the light source, in particular of the projector, is switched off during image recording in order to avoid scattered light in the system. In other words, the camera and the light source are controlled in such a way that the light source is switched off when the camera is used. Preferably, the suppression period, during which the light source is switched off, the mirrors are in the off state or in the off position or are in the second switch position and the camera records the image, is chosen to be so short that the camera use and/or the modulation is imperceptible to a person. The suppression period is preferably ≤25 ms. In other words, the mirrors of the modulator are briefly set to the corresponding mirror positions during operation in order to record the light image with the camera in such a way that this is imperceptible to an observer of an emitted light image.

In a further configuration of the invention, a mirror can be provided between the light source and the modulator. Alternatively or additionally, it is conceivable to provide a mirror between the modulator and the camera. A flexible and compact configuration of the arrangement is thus made possible.

For a compact arrangement that is simple in terms of device technology, it is conceivable to arrange the modulator on or approximately on a main axis of the light passage, in particular in the form of the lens. The camera and/or the light source can be arranged between the modulator and the light passage of the lens, viewed in the direction of the main axis. A main axis of the light emitted by the light source can preferably lie radially to the main axis of the light passage of the lens and/or be arranged parallel to a plane of extent of the modulator. It would also be conceivable to arrange the main axis of the light source obliquely or inclined to the main axis of the light passage of the lens. A modulator side having the mirrors is preferably arranged perpendicularly to the main axis, as a result of which the modulator has an extremely high efficiency.

The modulator and the light passage, for example in the form of the lens, are preferably arranged in a row. The mirror or mirrors or deflection mirror or deflection mirrors is/are provided, for example, adjacent to and/or outside of the beam path between the modulator and the light passage. Thus, in terms of device technology, light can be deflected via the deflection mirrors or the deflection mirror to the modulator and/or from the light source in a simple and cost-effective manner. The deflection mirrors are arranged, for example, in an approximately V-shape relative to one another. They can each form one leg of a V, wherein the legs are spaced apart and do not touch. Alternatively or additionally, the deflection mirror or mirrors can extend, for example, obliquely with respect to the direction of the main axis between the modulator and the light passage. They can in this case extend away from the main axis between the modulator and the light passage as the distance from the modulator increases. Furthermore, they can be arranged symmetrically to one another, for example. It is additionally conceivable that the camera and the light source are arranged opposite one another, in particular in one plane.

The light source or radiation source is preferably at least one light-emitting diode (LED). The latter can be in the form of at least one individually housed LED or in the form of at least one LED chip having one or more light-emitting diodes. A plurality of LED chips can be mounted on a common substrate ("submount") and form an LED, or they can be attached individually or together, for example, to a circuit board (e.g., FR4, metal-core circuit board, etc.) ("CoB"=chip on board). The at least one LED can be equipped with at least one separate and/or common optical unit for beam guidance, for example, with at least one Fresnel lens or a collimator. Instead of or in addition to inorganic LEDs, for example, based on AlInGaN or InGaN or AlInGaP, organic LEDs (OLEDs, e.g., polymer OLEDs) can generally also be used. The LED chips can be directly emitting or have an upstream phosphor. Alternatively, the light emitting component can be a laser diode or a laser diode arrangement. It is also conceivable to provide an OLED light-emitting layer or a plurality of OLED light-emitting layers or an OLED light-emitting region. The emission wavelengths of the light-emitting components can be in the ultraviolet, visible or infrared spectral range. The light-emitting components can additionally be equipped with a separate converter. The LED chips preferably emit white light in the standardized ECE white field of the automotive industry, implemented for example by a blue emitter and a yellow/green converter.

It is furthermore conceivable for the at least one light source to be designed as a light-emitting means operating according to a laser-activated remote phosphor (LARP) principle, and/or as a halogen lamp, and/or as a gas discharge lamp (high-intensity discharge (HID)), and/or in connection with a projector operating according to a digital light processing (DLP) principle, and/or as an IR radiation source, and/or as another apparatus emitting, reproducing and/or generating electromagnetic radiation in and/or partially in and/or close to and/or partially close to the visible range.

In a further preferred embodiment of the invention, it would be conceivable to use at least one light source in a specific color in addition or as an alternative to a white light source or to white light sources. For example, a plurality of light sources can also be provided in different colors, such as at least one light source for red light, at least one light source for green light, and at least one light source for blue light. It would also be conceivable to use one or more RGB LEDs as the light source. Alternatively or additionally, it would be conceivable to use light sources with different color temperatures. For example, two white LEDs with different color temperatures could be used. With this design, the colors and/or color temperatures and/or color shades could be adapted in the overlay image in order to further improve the visibility of objects.

Alternatively or additionally, an infrared (IR) light source could be provided as the light source. In this case, the camera is advantageously designed as an IR camera. The light image of the surrounding area of the arrangement could thus be recorded by the camera when using the IR light source.

A system having two arrangements would also be conceivable. These could then be controlled in dependence on one another, for example in order to jointly form a light image or overlay image.

According to the invention, a lamp, in particular a vehicle lamp, in particular for a vehicle, is provided with at least one arrangement according to one or more of the preceding and/or below aspects.

The lamp can be designed, for example, as a front light or front headlight or rear light or rear headlight or as a fog light. It is also conceivable to alternatively or additionally use the lamp for a signal light function and/or for an illumination function. The signal light function is, for example, a turn signal function and/or a brake light function and/or a rear light function and/or a daytime running light function and/or a position light function and/or a fog light function and/or a combination of the above and other functions. The illumination function can be a turn signal light function and/or a fog light function and/or a low beam function and/or a high beam function and/or a combination and/or modification (e.g., adaptive driving beam (ADB) or adaptive frontlighting system (AFS)) of said functions and further functions. AFS is an adaptive system that preferably adaptively controls all or at least some of the illumination functions. It can be used, for example, in the low beam and high beam functions and can provide a highway light and/or bad-weather light and/or a city light. ADB is preferably used with the high beam and can provide a glare-free high beam. For example, ADB is part of AFS. Another area of application for the lamp can be: effect illumination, entertainment illumination, architainment illumination, medical and therapeutic illumination, illumination for horticulture.

The light source of the arrangement can preferably be used in the lamp for one or more of the light functions listed above. The light source can thus have at least a dual or multi-function, to be precise being used for an overlay image and additionally performing one or more of the functions mentioned. This can be done, for example, by appropriately controlling the modulator and/or the light source.

In a preferred embodiment, multiple light sources are provided. It is conceivable that a respective light source irradiates a respective section of the modulator. It is also conceivable that some of the sections or all sections overlap. The light sources can also each irradiate the modulator completely or over its entire surface. One or more sections of the modulator can be irradiated, for example, by a plurality of light sources in order to irradiate specific regions in the emitted light image, such as a road, with a higher light intensity. The light sources can be of the same design. It would also be conceivable to design the light sources or some of the light sources differently, i.e., to use different types of light sources, for example. If, for example, a laser light apparatus/es is used as the light source/s, it is conceivable that the apparatus/es are configured in such a way that the laser light can run or scan at least in sections over the individual mirrors.

If at least one single light source is provided, the latter can irradiate the modulator over its entire surface or partially, or a light beam, for example a laser beam, can run over it at least in sections.

It is conceivable to provide at least one or more of the following operating situations for the arrangement. For example, in a first operating situation, the light source of the arrangement can be used to improve the display of specific objects or image regions or image parts for the vehicle driver, i.e., to generate an overlay image. This is the case, for example, when there is daylight and therefore no additional light, such as low beam or high beam, is necessary. In a second operating situation, for example, the light source of the arrangement is additionally used, besides for forming the overlay image, for full-area illumination, i.e., for example additionally as a low beam, fog light or high beam. This preferably takes place when there is little or no daylight.

In the, for example, first operating situation the modulator is preferably controlled with the light source switched on in such a way that the ascertained overlay image is emitted. This means that, for example, the corresponding mirrors of the modulator are switched, that is to say they are in an on state, for example, with the result that specific objects are better visible.

In the, for example, second operating situation, the light source is switched on for full-area illumination, for example, as a low beam, at least when the camera is not recording an image. To form the overlay image, the corresponding mirrors of the modulator are switched as a result of which some of the mirrors are in the on state and the other mirrors are in the off state. Part of the light is thus emitted outwardly via the mirrors that are in the on state to form the overlay image. Provision is preferably made here to increase the intensity of the light source when emitting the overlay image. The intensity is then reduced, and the mirrors are controlled according to the required function, such as low beam. This process described is repeated at a specific frequency (i.e., the mirrors are preferably switched at a specific frequency, and the intensity of the light source is increased at a specific frequency), which is preferably selected in such a way that a person, for example the vehicle driver, does not perceive the change between the functions.

In other words, the light sources are pulsed when the overlay image is projected, i.e., the DMD is operated in a clocked manner, and at the same time the brightness of the other LEDs that do not emit into the overlay region can be reduced. In this way, an increased brightness of the overlay region (and possibly a reduced brightness of the normal region) can be achieved.

Two lamps which are controlled in dependence on one another are preferably provided.

In another embodiment, a system has at least two lamps or has at least two arrangements.

According to the invention, a vehicle is provided with at least one arrangement according to one or more of the preceding aspects and/or with at least one lamp according to one or more of the preceding aspects.

The vehicle can be an aircraft or a water-bound vehicle or a land-bound vehicle. The land-bound vehicle can be a motor vehicle or a rail vehicle or a bicycle. The vehicle is particularly preferably a truck or a passenger car or a motorcycle. Furthermore, the vehicle can be designed as a non-autonomous or partially autonomous or autonomous vehicle.

According to the invention, a method with an arrangement according to one or more of the preceding aspects is provided. The light source and/or the modulator can then advantageously be controlled with the control means in dependence on the light image captured by the camera.

An arrangement or a projection headlight with a modulator, in particular with a DMD (digital mirror device), is disclosed. In this case, a projection lens of the arrangement not only images the image content of the modulator in the surrounding area, but also images the surrounding area on the modulator. The modulator can thus guide the imaging of the surrounding area to a camera and reflect light from a light source into the surrounding area.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
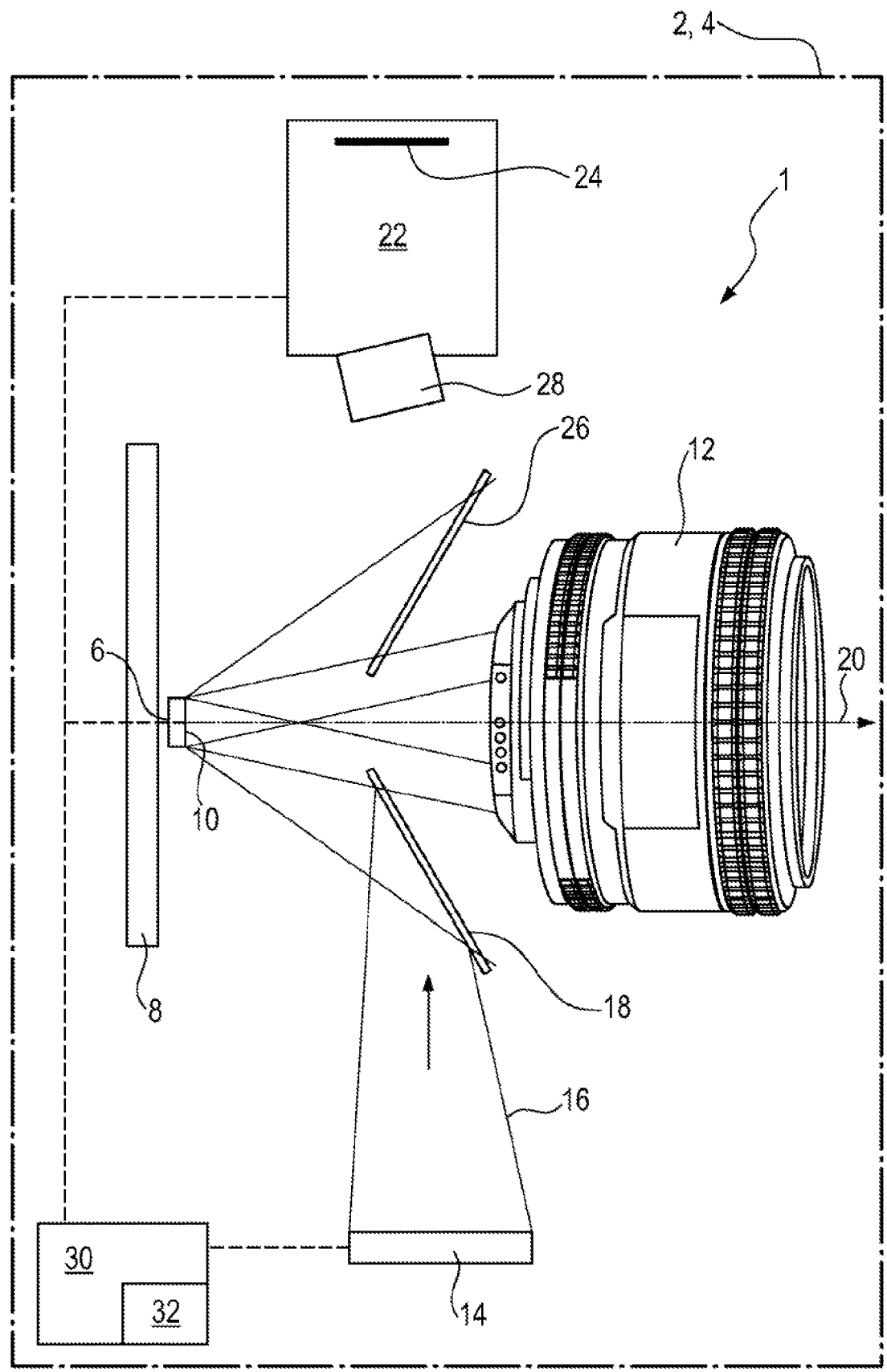
FIG. 1 shows a schematic illustration of an arrangement for a vehicle according to an exemplary embodiment.

FIG. 1 shows an arrangement 1 for a vehicle lamp 2. The vehicle lamp 2 is shown schematically with a dash-dotted line. The vehicle lamp 2 in turn can be part of a vehicle 4, which for the sake of simplicity is marked with the same dash-dotted line. The arrangement 1 has a modulator 6, which is arranged on a circuit board 8. The modulator 6 is designed, for example, as a digital micromirror actuator, or DMD. On its modulator side 10 facing away from the circuit board 8, the modulator has a multiplicity of mirrors or micromirrors, each of which forms a light pixel and is tiltable between two mirror positions. The modulator 6 points with its modulator side 10 toward a light passage of the arrangement 1 with a lens 12.

Furthermore, the arrangement 1 has a light source 14. Light 16 is emittable via the latter toward a deflection mirror 18. The light 16 is directed to the modulator side 10 of the modulator 6 via said deflection mirror. The deflection mirror 18 and the light source 14 are arranged here in such a way that the light 16 radiates approximately radially or perpendicularly with respect to a main axis 20 of the lens 12 to the deflection mirror 18. Viewed in the direction of the main axis 20, the modulator 6 is arranged on the axis of the lens 12. Furthermore, viewed in the direction of the main axis 20, the light source 14 is arranged between the modulator 6 and the lens 12 radially outside of the main axis 20. In a first position of a respective mirror of the modulator 6, the respective light that is incident on its respective mirror is then reflected toward the lens 12 in order to be emitted into the surrounding area.

Furthermore, the arrangement 1 from FIG. 1 has a camera 22. The camera is designed, for example, as a CCD or CMOS camera with a multiplicity of sensor pixels. The sensor pixels can be implemented with or without a color filter. The camera has an image sensor 24. The latter is arranged, for example, in such a way that it extends approximately perpendicularly to the plane of the modulator side 10 of the modulator 6 and/or at a parallel distance from the main axis 20. It preferably faces the main axis 20. Light or a light image that enters the arrangement 1 via the lens 12 can be directed toward a deflection mirror 26 in a second position of the mirrors of the modulator 6. The light image can be guided further via said deflection mirror to the camera 22, in particular to the image sensor 24. So that the image sensor 24 can record the light entering via the lens 12 without parallax, the camera 12 has a pivotable or tiltable lens element or lens 28. The camera 22 can thus image the modulator side 10 of the modulator 6 via the lens 28 in a Scheimpflug configuration from an oblique axis. This means that in the second switch position of the mirrors of the modulator 6 or some of the mirrors of the modulator 6, the camera can then display the light image that is reflected via the modulator 6, without parallax. A simple assignment of the image pixels of the image sensor 24 and the light pixels of the modulator 6 is thus made possible.

Furthermore, the arrangement 1 can have a control means or be connected to a control means wirelessly or via a cable. The control means is designed as a control unit 30, for example. The control unit 30 can control the light source 14 and/or the camera 22 and/or the modulator 6, for example. Furthermore, the control means, in particular in the form of the control unit 30, or a further control means, which is provided in the arrangement 1 or is connected to the arrangement 1 via cable or wirelessly, can have an image processing algorithm 32.

The image processing algorithm can be used for pattern recognition in which, for example, one or more of the following methods can be used: grayscale value correlation, geometric or edge-based pattern recognition, and pattern recognition with feature trees. Alternatively or additionally, it would be conceivable to use an artificial intelligence (AI) method, for example for classification, or another method. If no AI method is used, the latency time of the image processing algorithm could possibly be reduced due to the lower computational complexity. In the arrangement 1, the object or image recognition of the image processing algorithm is preferably designed in such a way that specific image contents, such as edges, are ascertainable. The light from the light source 14 can then be formed via the modulator 6 in such a way that the visibility, for example for a vehicle driver, is improved on the basis of the ascertained image contents, such as the edges. Demands on object recognition of the arrangement 1 may be lower in comparison with object recognition in driver assistance systems, for example. Very reliable object recognition is essential for driver assistance systems. In contrast to driver assistance systems, improved full-area illumination is made available in the arrangement 1, for example to the vehicle driver, who continues to control the vehicle independently. The image processing algorithm can thus be configured in a comparatively simple manner and/or require comparatively little computing capacity, which leads to a low latency time. If, for example, a computer-implemented neural network is used as the AI method, the demands in terms of training data for training the network are comparatively low. The neural network can also be designed to be comparatively simple.

Figure 2A:
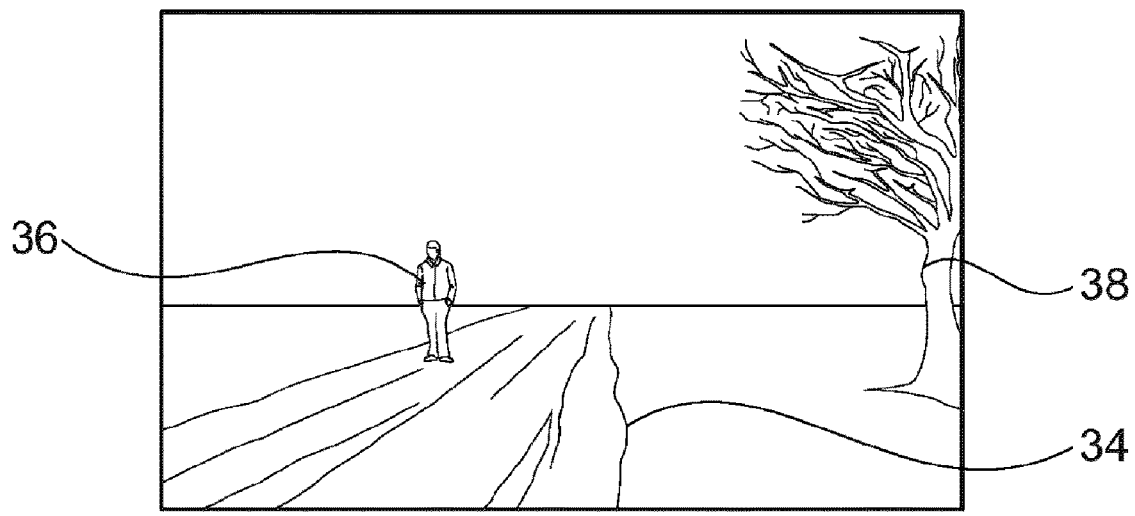
FIGS. 2a, 2b and 2c each schematically show a surroundings portion of the arrangement of FIG. 1.
Figure 2B:
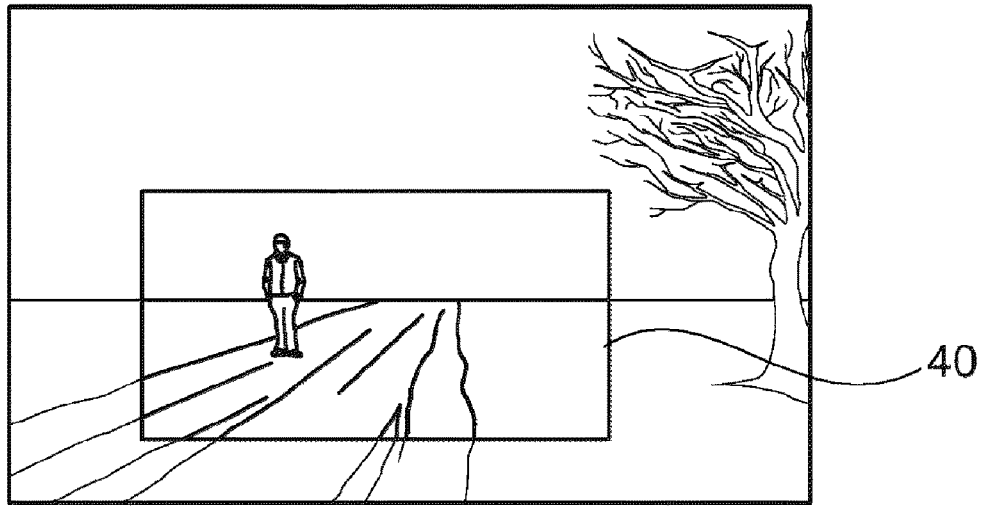
Figure 2C:
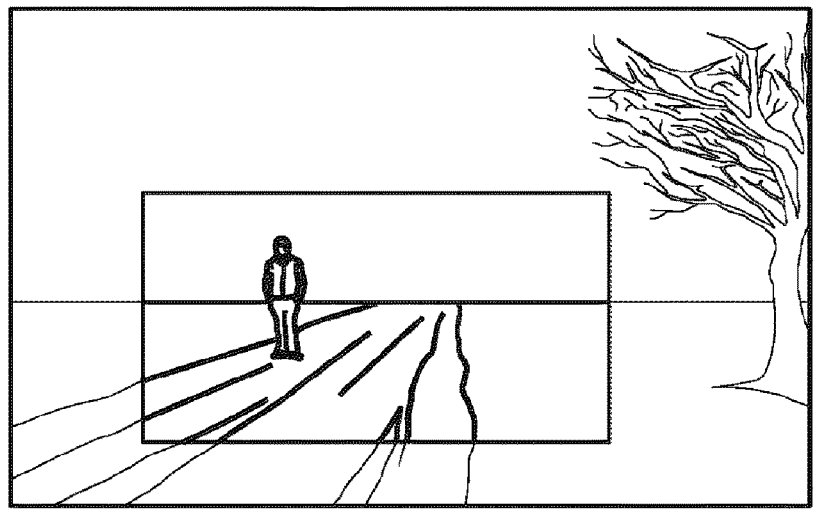

The use of the arrangement 1 from FIG. 1 will now be explained below with reference to FIGS. 2*a* to 2*c*. FIG. 2*a* shows the detail of a surrounding area of the vehicle 4, which is a front view of a vehicle driver and a front surrounding area of the vehicle. Here, a road 34 can be seen on which a person 36 is standing. A tree 38 is also shown. In addition, it is night and foggy. The light source 14 of the arrangement 1 from FIG. 1 emits light with the modulator 6 in the direction ahead of the vehicle, i.e., at least onto the road 34 and onto objects, such as the person 36, which are present in the fully illuminated region. For this purpose, the mirrors or at least some of the mirrors of the modulator 6 are in their first switch positions. In order to now improve visibility, a light image of part of the detail of the surrounding area shown in FIG. 2*a* is guided to the modulator 6 via the lens 12 of the arrangement 1 from FIG. 1. At least some of the mirrors or all of the mirrors are then briefly switched to their second switch positions via the control unit 30. The light image is then guided via the deflection mirror 26 and the lens 28 to the image sensor 24 and is thereby captured. The light image is then analyzed via the image processing algorithm 32 and a contrast is ascertained. An overlay image 40, which is shown in FIG. 2*b*, is then ascertained therefrom. The mirrors of the modulator 6 are now controlled by the control unit 30 in such a way that the light 16 from the light source 14 forms the overlay image 40 after the modulator 6. The overlay image is then projected into the surrounding area via the lens 12, preferably at least partially or completely into the region that is capturable by the camera. The result is then shown in FIG. 2*c*. It can be seen that part of the surroundings portion is irradiated with a modulated light distribution, i.e., with the overlay image 40 from FIG. 2*b*. A contrast is thus clearly enhanced and immediately perceptible to a vehicle driver.

The overlay image 40 is preferably generated by controlling the modulator 6 accordingly. The camera 22 preferably records the light images or images in the dark state, i.e., when the light source 14 is switched off. Advantageously, therefore, no synchronization or adaptation of overlay regions and specific regions of the light image is required.

Figure 3A:
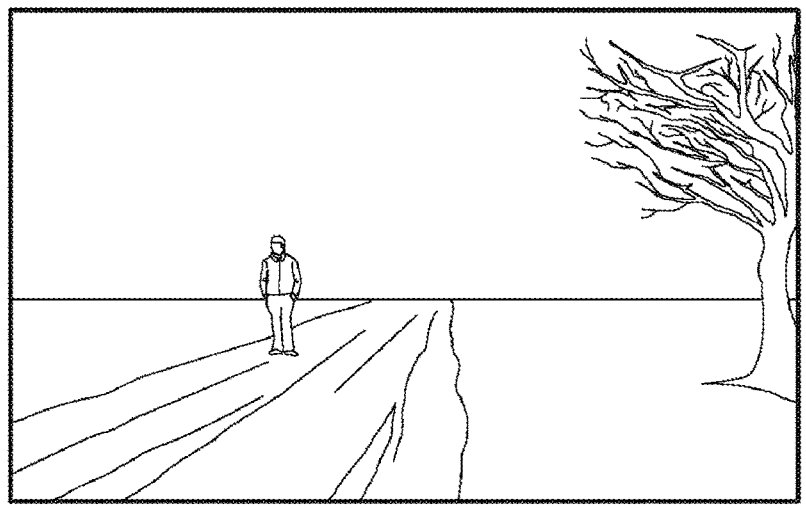
FIGS. 3a, 3b and 3c each schematically show a surroundings portion of the arrangement of FIG. 1.
Figure 3B:
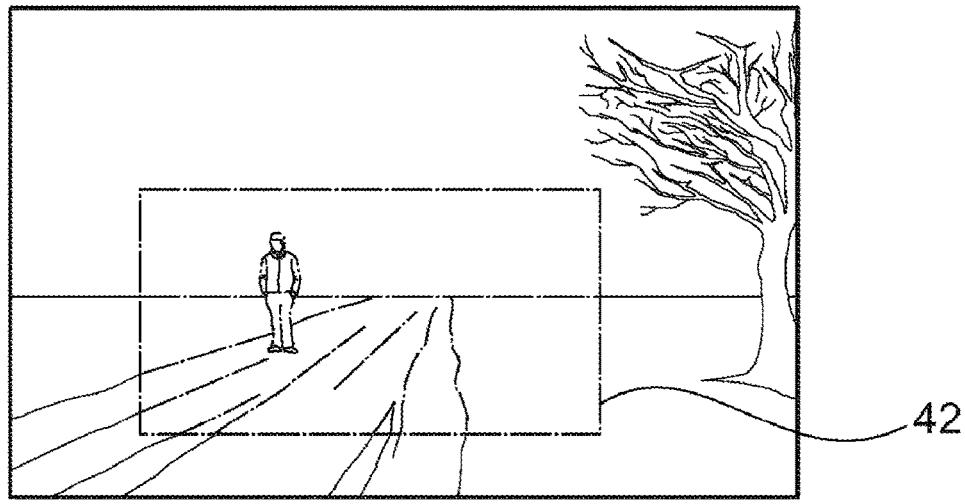
Figure 3C:
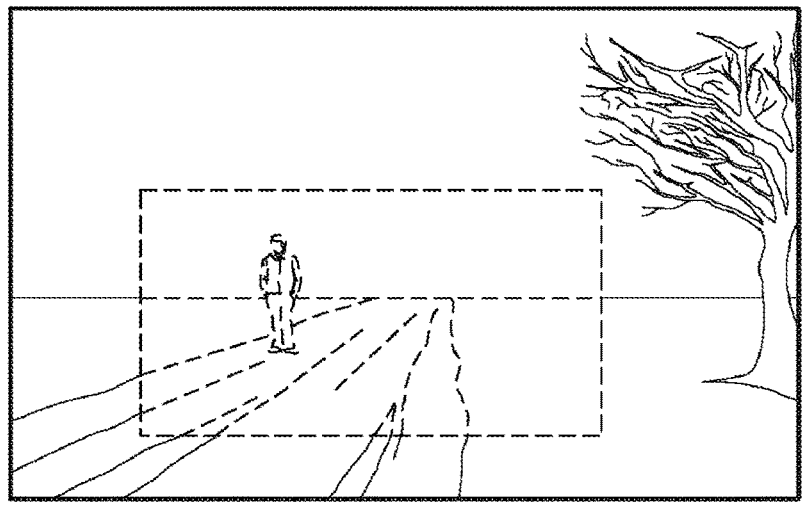

FIGS. 3*a* and 3*c* show a further possibility of improving the visibility for a vehicle driver. FIG. 3*a* corresponds to FIG. 2*a* in this case. In contrast to FIGS. 2*a* to 2*c*, the light image is analyzed by the image processing algorithm 32 in such a way that edges are ascertainable. The control unit 30 from FIG. 1 thus ascertains an overlay image 42, see FIG. 3*b*, in which edge enhancement takes place. The overlay image 42 from FIG. 3*b* is then emitted from the arrangement 1 into the surrounding area by way of the modulator 6 being controlled accordingly via the control unit 30. FIG. 3*c* shows the overlay image 42 projected into the surrounding area together with the surrounding area. The edges of the surroundings portion in the region of the projected overlay image are clearly more visible to the vehicle driver.

A size of the overlay image in the embodiments can preferably be adjusted, in particular by the control unit. This is preferably accomplished by controlling the modulator accordingly. The size of the overlay image is adjusted, for example, in dependence on the object size(s) and/or the object position(s) of the object or of the objects that are to be illuminated more intensely.

It is conceivable that an overlay image in which both the contrast and the edges are enhanced is ascertained and/or formed. In addition, it is alternatively or additionally conceivable to create an overlay image in which alternatively or additionally at least one other property of the light image and/or alternatively or additionally at least one other image structure is/are ascertained and enhanced.

REFERENCE NUMERALS

Arrangement 1
Vehicle lamp 2
Vehicle 4
Modulator 6
Circuit board 8
Modulator side 10
Lens 12
Light source 14
Light 16
Deflection mirror 18
Main axis 20
Camera 22
Image sensor 24
Deflection mirror 26
Lens 28
Control unit 30
Image processing algorithm 32
Road 34
Person 36
Tree 38
Overlay image 40

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

The invention claimed is:

1. An optical arrangement comprising:
   a light source that emits light;
   a light passage;
   a spatial modulator that controls the emitted light received from the light source, wherein the spatial modulator directs the emitted light received from the light source out of the optical arrangement through the light passage;
   a camera that captures an image from incident light coming from an object, wherein the incident light enters the optical arrangement from the object through the light passage and then is reflected off the spatial modulator before reaching the camera, where the image is captured from the incident light; and
   a controller that controls the spatial modulator, wherein the controller controls the spatial modulator to direct the emitted light through the light passage based on the image captured by the camera.

2. The optical arrangement of claim 1, wherein the controller uses an image processing algorithm to analyze the image captured by the camera, and wherein the controller controls the spatial modulator based on how the image is analyzed using the image processing algorithm.

3. The optical arrangement of claim 2, wherein the image processing algorithm is used to analyze image characteristics of the image captured by the camera, and wherein the image characteristics are selected from the group consisting of: edges in the image, structures in the image, and contrast in the image.

4. The optical arrangement of claim 3, wherein the controller controls the spatial modulator based on the image characteristics.

5. The optical arrangement of claim 1, wherein the controller controls the spatial modulator based on how edges in the image are analyzed and directs the emitted light through the light passage such that edges in a surrounding area captured by the camera are more brightly illuminated by the emitted light.

6. The optical arrangement of claim 1, wherein the controller controls the spatial modulator based on how contrast in the image is analyzed and directs the emitted light through the light passage onto a surrounding area captured by the camera such that contrast for an observer is increased.

7. The optical arrangement of claim 1, wherein the spatial modulator includes a plurality of mirrors, wherein each of the plurality of mirrors is tiltable in both in a first mirror position in which the emitted light is reflected out through the light passage and in a second mirror position in which incident light entering through the light passage is guided towards the camera.

8. The optical arrangement of claim 1, wherein the spatial modulator includes a plurality of mirrors, wherein each of the plurality of mirrors is independently tiltable, and wherein incident light entering through the light passage that is reflected by one of the plurality of mirrors towards the camera corresponds to a pixel of the image.

9. The optical arrangement of claim 1, further comprising:
a lens, wherein the lens, the spatial modulator and an image sensor of the camera are arranged in a Scheimpflug configuration.

10. The optical arrangement of claim 1, wherein the camera includes an image sensor with light-sensitive areas corresponding to pixels of the image, wherein the spatial modulator includes a plurality of mirrors, and wherein incident light entering through the light passage is guided by each of the plurality of mirrors towards a corresponding one of the light-sensitive areas.

11. The optical arrangement of claim 1, further comprising:
a deflection mirror disposed between the light source and the spatial modulator, wherein emitted light from the light source is reflected by the deflection mirror onto the spatial modulator.

12. The optical arrangement of claim 1, further comprising:
a deflection mirror disposed between the spatial modulator and the camera, wherein incident light from the light passage that is reflected by the spatial modulator is deflected by the deflection mirror towards the camera.

13. A method of operating an optical arrangement, comprising:
orienting each of a plurality of mirrors of a spatial modulator both in a first mirror position and in a second mirror position, wherein in the first mirror position emitted light from a light source is reflected by the plurality of mirrors out of the optical arrangement through a light passage, and wherein in the second mirror position incident light coming from objects and entering the optical arrangement from the objects through the light passage is then reflected by the plurality of mirrors towards an image sensor of a camera; and
capturing an image from the incident light, wherein the incident light coming from the objects enters the optical arrangement through the light passage and is then reflected by the plurality of mirrors towards the image sensor of the camera, where the image is captured from the incident light, and wherein the emitted light is directed out through the light passage based on the image captured by the camera.

14. The method of claim 13, further comprising:
analyzing the image captured by the camera using an image processing algorithm to detect edges in the image; and
controlling each of the plurality of mirrors of the spatial modulator in the first mirror position such that edges in a surrounding area captured by the camera are more brightly illuminated.

15. The method of claim 13, further comprising:
analyzing the image captured by the camera using an image processing algorithm; and
controlling each of the plurality of mirrors of the spatial modulator in the first mirror position based on how the image is analyzed using the image processing algorithm.

16. The method of claim 15, further comprising:
directing the emitted light through the light passage such that the objects in a surrounding area captured by the camera are more brightly illuminated by the emitted light based on how the objects in the image are analyzed using the image processing algorithm.

17. The method of claim 15, further comprising:
directing the emitted light through the light passage such that contrast perceived by an observer of a surrounding area captured by the camera is increased based on how contrast in the image is analyzed using the image processing algorithm.

18. The method of claim 13, wherein the image sensor of the camera includes light-sensitive areas corresponding to pixels of the image captured by the camera, further comprising:
independently orienting each of the plurality of mirrors of the spatial modulator in the second mirror position such that the incident light entering through the light passage is reflected by each of the plurality of mirrors towards one of the light-sensitive areas that corresponds to a pixel of the image.

19. A lamp of a motor vehicle, comprising:
a light source that emits light;
a light passage;
a spatial modulator that controls the emitted light received from the light source, wherein the spatial modulator directs the emitted light received from the light source out of the lamp through the light passage onto a surrounding area of the motor vehicle;
a camera that captures an image from incident light coming from a surrounding area of the motor vehicle, wherein the incident light enters the lamp from the surrounding area through the light passage and then is reflected off the spatial modulator before reaching the camera, where the image is captured from the incident light, wherein the image depicts the surrounding area of the motor vehicle; and
a controller that controls the spatial modulator, wherein the controller controls the spatial modulator to direct the emitted light through the light passage based on the image captured by the camera.

20. The lamp of claim 19, wherein the controller controls the spatial modulator based on edges detected in the image and directs the emitted light through the light passage such that edges in the surrounding area of the motor vehicle are more brightly illuminated by the emitted light.

* * * * *